(12) United States Patent　　(10) Patent No.:　US 12,613,778 B2
Lin et al.　　(45) Date of Patent:　Apr. 28, 2026

(54) REMEDIATION ACTION INITIATION RESPONSIVE TO STORAGE CONTROL FEATURE DISABLING

(71) Applicant: Hewlett-Packard Development Company, L.P., Spring, TX (US)

(72) Inventors: Wen-Bin Lin, Taipei (TW); Chao-Wen Cheng, Taipei (TW); Chien-Cheng Su, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/695,706

(22) PCT Filed: Oct. 28, 2021

(86) PCT No.: PCT/US2021/056944
§ 371 (c)(1),
(2) Date: Mar. 26, 2024

(87) PCT Pub. No.: WO2023/075769
PCT Pub. Date: May 4, 2023

(65) Prior Publication Data
US 2024/0419532 A1　　Dec. 19, 2024

(51) Int. Cl.
*G06F 11/14*　　(2026.01)
(52) U.S. Cl.
CPC ........ *G06F 11/142* (2013.01); *G06F 11/1417* (2013.01); *G06F 11/1441* (2013.01)
(58) Field of Classification Search
CPC ............... G06F 11/1417; G06F 11/142; G06F 11/1441; G06F 11/2092
See application file for complete search history.

(56) References Cited

U.S. PATENT DOCUMENTS

| | | | | |
|---|---|---|---|---|
| 6,230,285 B1 * | 5/2001 | Sadowsky | ........... | G06F 11/1417 714/25 |
| 6,275,930 B1 * | 8/2001 | Bonamico | ........... | G06F 11/1417 713/1 |
| 2004/0064761 A1 * | 4/2004 | Harrington | ......... | G06F 11/1417 714/E11.133 |
| 2014/0082160 A1 | 3/2014 | Mallur et al. | | |
| 2014/0281151 A1 | 9/2014 | Yu et al. | | |
| 2015/0331768 A1 * | 11/2015 | Chadha | ............... | G06F 11/1048 714/6.3 |

(Continued)

OTHER PUBLICATIONS

"How to Configure RAID or Intel Optane Memory with Intel RST on an Intel VMD Capable Platform", Intel, Nov. 4, 2020, Retrieved from the internet: <https://www.intel.com/content/www/us/en/support/articles/000057787/memory-and-storage/intel-optane-memory.html> (Year: 2020).*

(Continued)

*Primary Examiner* — Marc Duncan
*Assistant Examiner* — Albert Li
(74) *Attorney, Agent, or Firm* — Quarles & Brady LLP

(57) ABSTRACT

In some examples, a system detects disabling of a driver of a storage control feature included in a main processor of the system, where the storage control feature to manage access of a storage device. In response to detecting the disabling of the driver of the storage control feature included in the main processor, the system initiates a remediation action to prevent a fault in the system.

17 Claims, 4 Drawing Sheets

(56) References Cited

U.S. PATENT DOCUMENTS

2017/0199776 A1\*  7/2017  Dasar .................... G06F 11/079
2018/0321879 A1    11/2018  Lu
2020/0042391 A1\*  2/2020  Pepper ................ G06F 11/1417

OTHER PUBLICATIONS

"Intel RST", Ubuntu, Aug. 16, 2021, Retrieved from the internet: <https://web.archive.org/web/20210816070107/https://help.ubuntu.com/rst/> (Year: 2021).\*
Dell Community, Intel RST Drivers cause BSOD, Sep. 25, 2019 (9 pages).
Dell US, What is Intel Rapid Storage Technology Software, Jun. 30, 2021 (3 pages).
Intel VMD, Deploy Next Generation Storage with Confidence, downloaded Oct. 8, 2021 (5 pages).
Joe Staples, Intel Volume Management Device and Intel Platform Trust Technology downloaded Oct. 8, 2021 (6 pages).
Microsoft Community, USB Mass Storage Device Has Been Disabled, Jul. 16, 2013 (6 pages).
Windows Client Management—Microsoft Docs, Advanced troubleshooting for Stop error or blue screen error issue, Aug. 27, 2021 (23 pages).

\* cited by examiner

300

Storage Medium

302

Storage Control Feature Driver Disabling Detection Instructions

304

Remediation Action Initiation Instructions

400

System

406

Main Processor

408

Storage Control Feature

404

Chipset

418

Storage Control Feature

409

Storage Medium

410

Program

412

First Driver

414

Second Driver

402

Storage Device

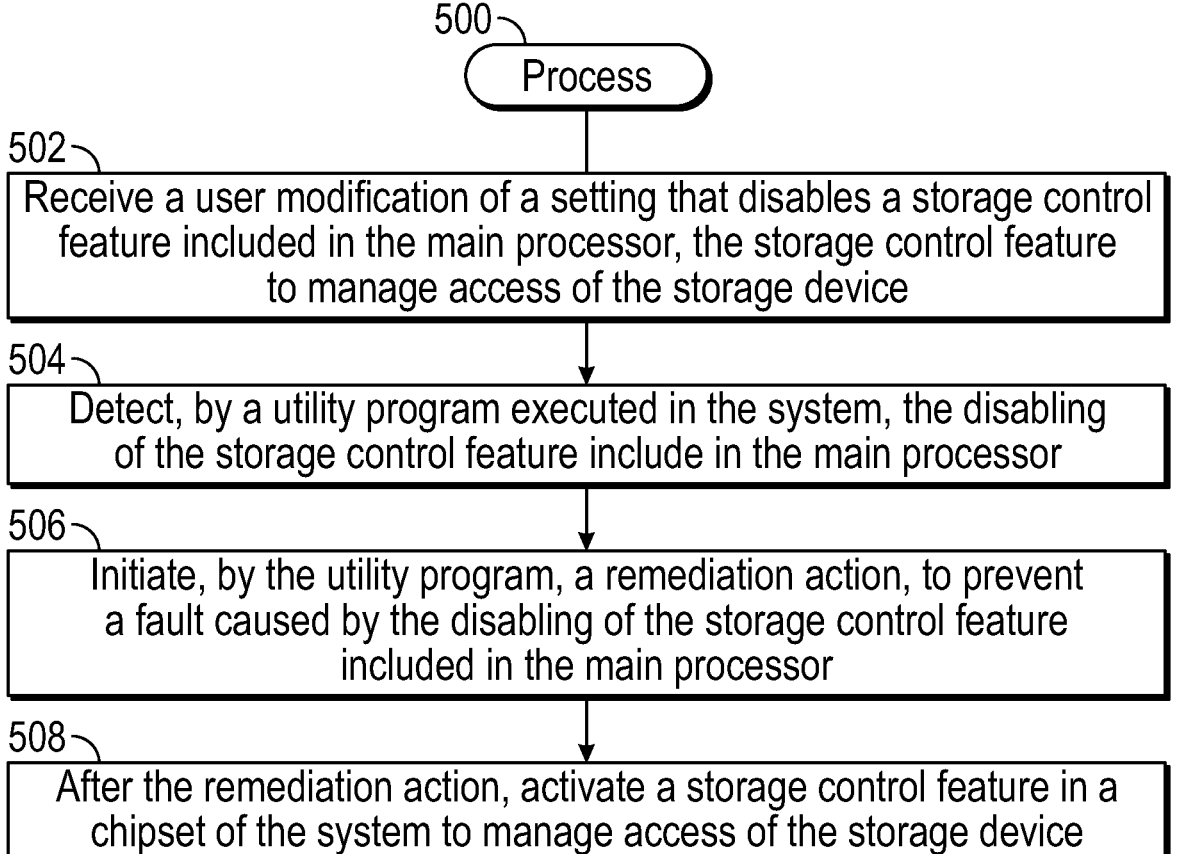

500 ⟋
Process

502 ⟋
Receive a user modification of a setting that disables a storage control feature included in the main processor, the storage control feature to manage access of the storage device 504 ⟋
Detect, by a utility program executed in the system, the disabling of the storage control feature include in the main processor 506 ⟋
Initiate, by the utility program, a remediation action, to prevent a fault caused by the disabling of the storage control feature included in the main processor 508 ⟋
After the remediation action, activate a storage control feature in a chipset of the system to manage access of the storage device

FIG. 5

REMEDIATION ACTION INITIATION RESPONSIVE TO STORAGE CONTROL FEATURE DISABLING

BACKGROUND

A system can include a storage device (or multiple storage devices) to store data and other information, such as machine-readable instructions. Access of the storage device can be managed by a storage controller in the system.

BRIEF DESCRIPTION OF THE DRAWINGS

Some implementations of the present disclosure are described with respect to the following figures.

FIG. 5 is a flow diagram of a process according to some examples.

Figure 1:
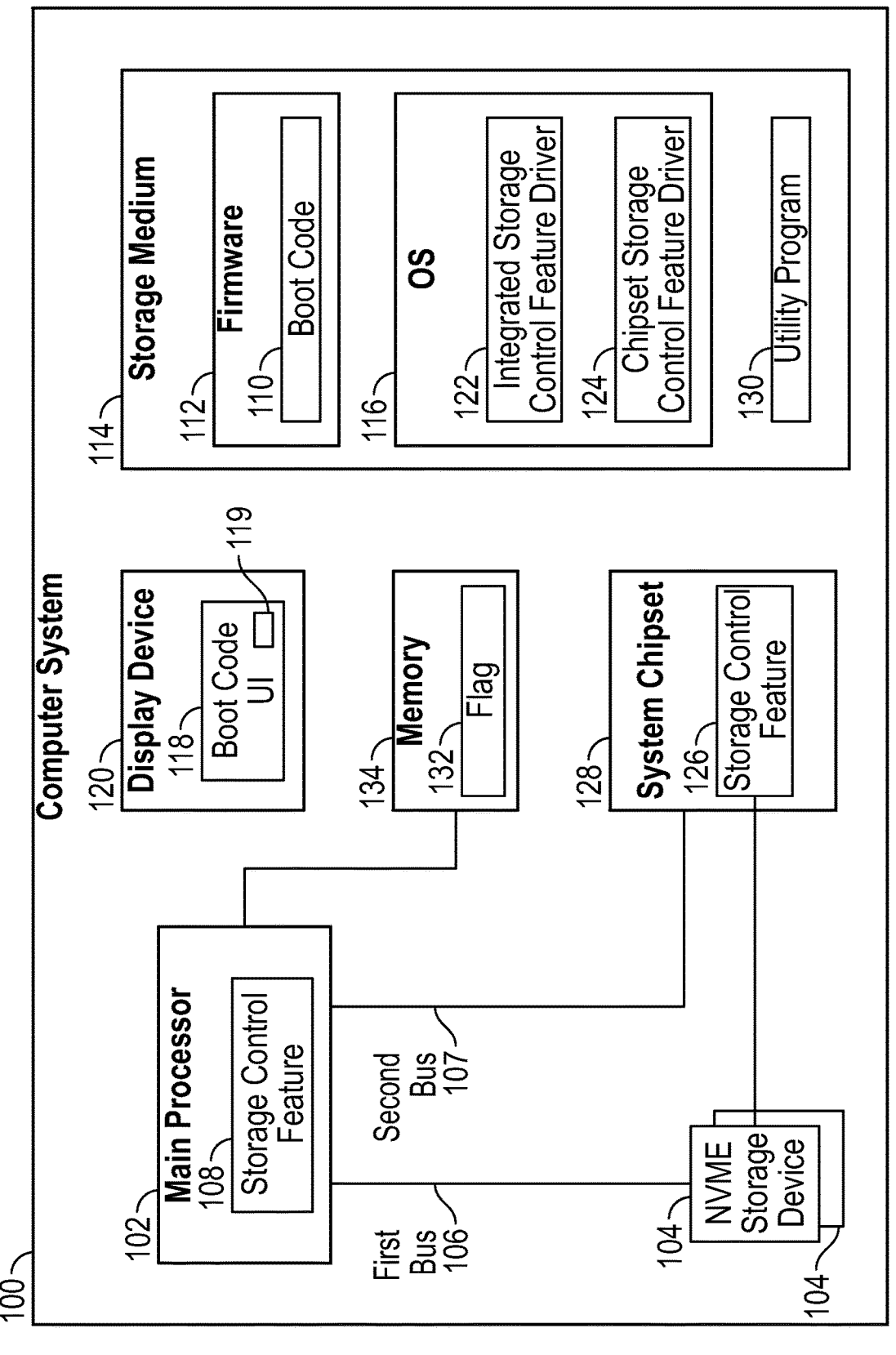
FIG. 1 is a block diagram of a computer system, in accordance with some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, a type of storage device is a solid-state drive (SSD) that uses a non-volatile memory, such as a flash memory or another type of non-volatile storage, to store information (including data and machine-readable instructions). A communication interface that can be used to access an SSD or another type of storage device is according to a Non-Volatile Memory Express (NVME) protocol. In other examples, other types of communication interfaces can be used to access storage devices, such as a Serial Advanced Technology Attachment (SATA) communication interface, an Advanced Host Controller Interface (AHCI) communication interface, and so forth.

In some examples, a storage controller used to access a storage device, such as an NVME storage device, can be implemented in a chip that is separate from a main processor of a system. A "main processor" of a system can refer to a processor used to execute an operating system (OS) of the system, along with other program code, such as firmware, application programs, and/or other types of machine-readable instructions. The chip that includes the storage controller can be part of a chipset of the system. A "chipset" refers to a collection of electronic components (where the collection can include a single electronic component or multiple electronic components) that provides access to various peripheral components of the system. The peripheral components can include a storage device (or multiple storage devices), an input/output (I/O) device, a network interface controller, and so forth.

With advancements in processor technology, some main processors can integrate storage control features within the main processors. A storage control feature integrated within a main processor can be used to manage access of storage devices, such as NVME storage devices. An example of a storage control feature integrated within a main processor is the Volume Management Device (VMD) in an INTEL processor. Although reference is made to the VMD as an example of a storage control feature integrated in a main processor, it is noted that in other examples, main processors from other vendors can also include storage control features to manage access of storage devices, without having to employ storage control features in a chipset that is separate from the main processors.

To support the use of a storage control feature included in a main processor, a driver for the storage control feature is loaded and executed in a system. A program that is to access information stored in the storage device can issue requests that are handled by the driver to control operations of the storage control feature in accessing the storage device in response to the requests from the program. Programs that can access information stored in a storage device can include an OS, an application program, firmware, or other types of machine-readable instructions.

In some cases, a user of a system may wish to disable a storage control feature that is integrated in the main processor of the system. There may be various reasons for disabling the storage control feature integrated in the main processor. As an example, the user may observe anomalous behavior of the storage control feature in the main processor, or the user may wish to use an OS that does not support a driver for the storage control feature in the main processor (by using a legacy mechanism without the integrated storage control feature), and so forth.

In accordance with some implementations of the present disclosure, mechanisms are provided to detect disabling of a driver of the storage control feature integrated in the main processor, and in response to detecting the disabling of the driver of the storage control feature integrated in the main processor, the mechanisms initiate a remediation action to prevent a fault in the system. An example of a fault that may occur due to disabling of the driver of the integrated storage control feature is a stop error or blue screen error that may be presented due to an error in a system that reduces operational reliability of the system when accessing storage data. The stop error or blue screen error can also be referred to as a blue screen of death (BSOD) in examples where the OS is a WINDOWS OS. If other OSes are used (e.g., Linux, etc.), similar faults may be presented when a storage control feature included a main processor is disabled by the user.

FIG. 1 is a block diagram of a computer system 100 that includes various electronic components. Examples of computer systems can include any or some combination of the following: desktop computers, notebook computers, tablet computers, smartphones, server computers, game appliances, vehicle controllers, Internet-of-Things (IoT) devices, storage systems, communication nodes, and so forth.

The computer system 100 includes a main processor 102, such as an INTEL processor or a processor from another vendor. Although FIG. 1 shows the computer system 100 with one main processor 102, in other examples, the computer system 100 can include multiple main processors.

The computer system 100 also includes storage devices, such as NVME storage devices 104, which can be accessed by the main processor 102. Although FIG. 1 shows multiple NVME storage devices 104, in other examples, the computer system 100 can include just one NVME storage device 104. Also, in other examples, other types of storage devices 104 that employ other storage access protocols (different from NVME) can be employed.

The main processor 102 is connected over a first bus 106 to the NVME storage devices 104. In some examples, the first bus 106 is a Peripheral Component Interconnect Express (PCI-E) bus. In other examples, the first bus 106 can be a different type of bus.

The main processor 102 includes an integrated storage control feature 108 that if enabled can allow the main processor 102 to directly access the NVME storage devices 104 over the first bus 106. The integrated storage control feature 108 can perform storage control functions to manage the access (including reads and writes) of information stored in the NVME storage devices 104. The integrated storage control feature 108 is effectively a storage controller that is part of the main processor 102.

The main processor 102 is also connected over a second bus 107 to a system chipset 128. In some examples, the second bus 107 is a Direct Media Interface (DMI) bus to allow communication (of control instruction and data flow) between the main processor 102 and the system chipset 128. In other examples, the second bus 107 is a different type of bus.

Whether or not the integrated storage control feature 108 storage control feature 108 is enabled can be controlled by a user during a boot process performed by boot code 110, which can be part of firmware 112 stored in a storage medium 114. Examples of the boot code 110 can include a Basic Input/Output System (BIOS) code, or program code according to a Unified Extensible Firmware Interface (UEFI).

The storage medium 114 can be implemented using a collection of storage devices, where a "collection" can include a single storage device or multiple storage devices. The storage medium 114 can include the NVME storage devices 104 (or portions of the NVME storage devices 104), or can include other storage devices.

The boot code 110 performs initial tasks of the computer system 100 when the computer system 100 starts up from an off state, a lower power state, or after a reset. The boot code 110 can perform a Power on Self Test (POST) process to verify and initialize hardware components and other components of the computer system 100. The boot code 110 can also perform other tasks. At the end of the boot process, the boot code 110 can launch an OS 116, which can also be stored in the storage medium 114.

Note that the firmware 112 including the boot code 110 can be executed by the main processor 102. The OS 116 when launched also executes on the main processor 102.

During the boot process, the boot code 110 can present, if requested by a user, a boot code user interface (UI) 118 (e.g., including a boot code setup menu) that presents various settings that can be adjusted by the user. The boot code UI 118 can be displayed in a display device 120 of the computer system 100.

Adjustments of the settings can enable a feature in the computer system 100, disable a feature in the computer system 100, change a value associated with a feature in the computer system 100, and so forth. One of the settings presented by the boot code UI 118 is a setting (referred to as an "integrated storage control feature setting" 119 associated with enabling or disabling the integrated storage control feature 108 in the main processor 102.

If the user sets the integrated storage control feature setting 119 to a first value, then the integrated storage control feature 108 is enabled. However, if the user sets the integrated storage control feature setting 119 to a different second value, then the integrated storage control feature 108 is disabled.

In some examples, the integrated storage control feature setting 119 can default to the first value to enable the integrated storage control feature 108, subject to modification by a user if the user wishes to disable the integrated storage control feature 108.

Although reference is made to a user adjusting a setting to enable or disable the integrated storage control feature 108, in other examples, another entity (a program or a machine) can adjust a setting to enable or disable the integrated storage control feature 108.

The OS 116 includes an integrated storage control feature driver 122 (e.g., a VMD driver) for controlling an operation of the storage control feature 108 integrated in the main processor 102. The OS 116 can also include a chipset storage control feature driver 124 that is to control an operation of a storage control feature 126 in a system chipset 128 of the computer system 100.

If the integrated storage control feature setting 119 in the boot code UI 118 is set to the first value, then the integrated storage control feature driver 122 is enabled so that the integrated storage control feature 108 is enabled to allow the main processor 102 (or more specifically, program code executed on the main processor 102) to access the NVME storage devices 104 over the first bus 106 (e.g., PCI-E bus), and also to access over the second bus 107 (e.g., DMI bus) any NVME devices attached to the system chipset 128.

On the other hand, if the integrated storage control feature setting 119 of the boot code UI 118 is set to the second value to disable the integrated storage control feature 108, then the integrated storage control feature driver 122 is disabled, and the chipset storage control feature driver 124 is enabled. Disabling the integrated storage control feature driver 122 can refer to removing (e.g., uninstalling) the integrated storage control feature driver 122 or otherwise setting the integrated storage control feature driver 122 in a non-operational state, so that a legacy mode driver (e.g., 124) of the OS 116 can be used.

The chipset storage control feature driver 124 being enabled means that the chipset storage control feature driver 124 executes on the main processor 102. In this case, the main processor 102 would access the NVME storage devices 104 using the storage control feature 126 of the system chipset 128, instead of directly over the first bus 106. The main processor 102 can be connected to the system chipset 128 over the second bus 107.

As noted above, if a user disables the integrated storage control feature 108 of the main processor 102, then a fault (e.g., a BSOD) may occur in the computer system 100 if a remediation action is not applied. In accordance with some implementations of the present disclosure, a utility program 130, which can be stored in the storage medium 114, can execute in the computer system 100, such as on the main processor 102. The utility program 130 can be invoked after the OS 116 is launched, so that the utility program 130 executes in an environment of the OS 116.

The utility program 130 can monitor whether or not the integrated storage control feature 108 is disabled. If the detects that the integrated storage control feature 108 is disabled, the utility program 130 can initiate a remediation action to be applied to avoid a fault in the computer system 100 due to the integrated storage control feature 108 being disabled.

Figure 2:
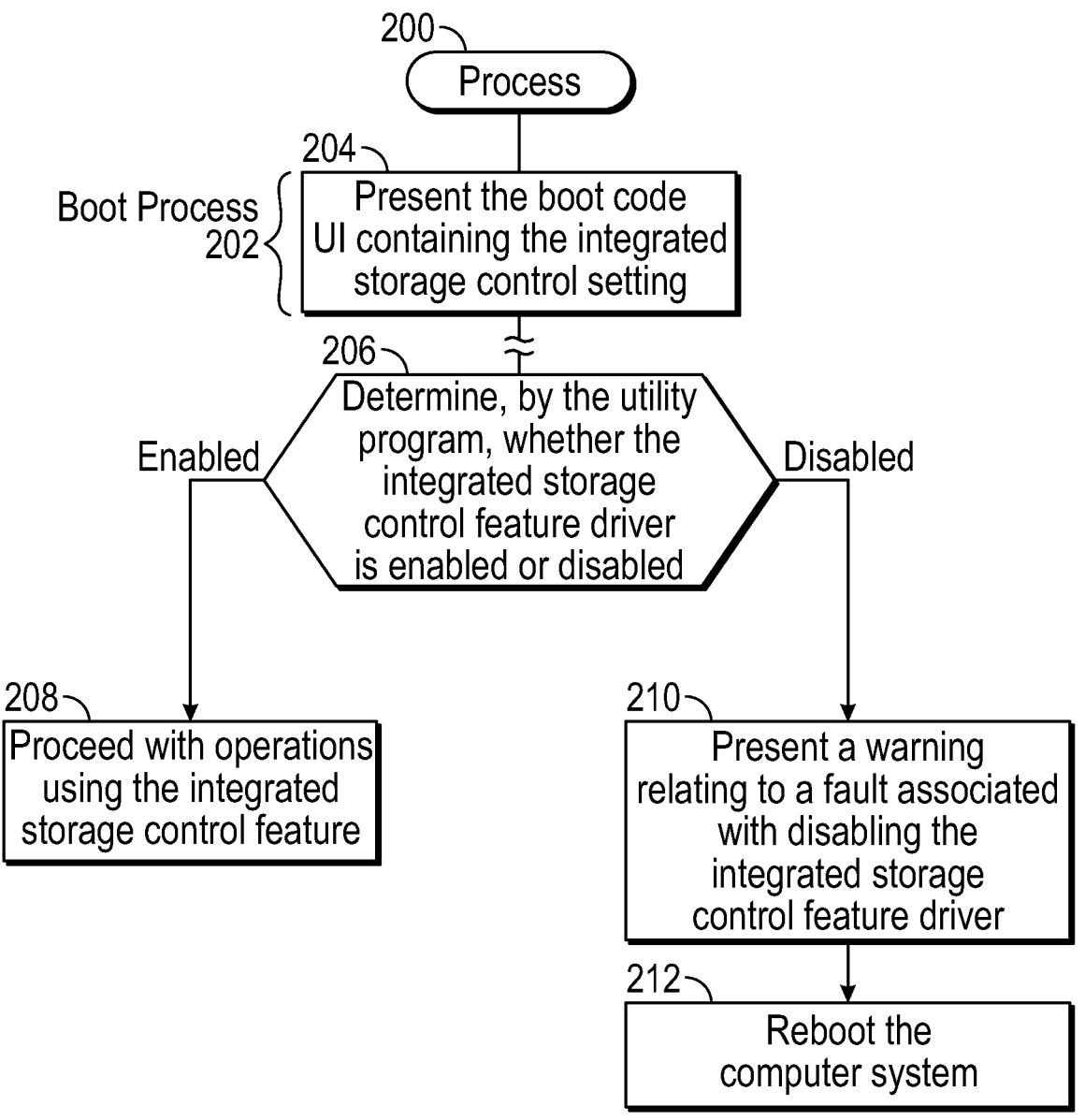
FIG. 2 is a flow diagram of a process according to some examples.

FIG. 2 is a flow diagram of a process 200 that can be performed in the computer system 100, in accordance with some examples. During a boot process 202, the boot code 110 can present (at 204) the boot code UI 118, in which the integrated storage control feature setting 119 is at the first value (e.g., by default) to indicate that the integrated storage control feature 108 is enabled. It is possible for the user to modify the storage control feature setting to the second value to disable the integrated storage control feature 108.

Once the boot process 202 is complete and the OS 116 is launched, the utility program 130 can execute to determine (at 206) whether the integrated storage control feature driver 122 is enabled or disabled (such as based on the value of the integrated storage control feature setting 119. In some examples, the utility program 130 can perform the foregoing determination by checking a state of a flag 132 (FIG. 1) or another indicator. The flag 132 is stored in a memory 134 (FIG. 1).

The memory 134 can be implemented using a collection of memory devices (a single memory device or multiple memory devices), such as dynamic random access memory (DRAM) devices, static random access memory (SRAM) devices, and so forth.

The value of the flag 132 may be set by the boot code 110 based on the value of the integrated storage control feature setting 119. The flag 132 may be set by the boot code 110 to a first state if the integrated storage control feature setting 119 is set to the first value, and to a different second stated if the storage control feature setting 119 is set to the second value.

If the utility program 130 determines (at 206), based on the state of the flag 132, that the integrated storage control feature driver 122 is enabled (which means that the integrated storage control feature driver 122 is installed and capable of running in the computer system 100), the utility program 130 takes no further action, and the computer system 100 can proceed (at 208) with operations in which the integrated storage control feature 108 allows the main processor 102 to access the NVME storage devices 104.

However, if the utility program 130 determines (at 206), based on the state of the flag 132, that the integrated storage control feature driver 122 is disabled, then the utility program 130 can present (at 210) a warning, such as in the display device 120, to the user. The warning can state that removal of the integrated storage control feature 108 can cause a fault such as a BSOD. The warning can also seek the user to confirm that the user wishes to disable integrated storage control feature driver 122, which would cause the disable integrated storage control feature driver 122 to be uninstalled, for example. Also, the warning can notify the user that the user should restart the computer system 100 (which is an example of a remediation action) after disabling the integrated storage control feature driver 122. Rebooting (at 212) the computer system 100 after uninstalling the integrated storage control feature driver 122 can allow a configuration of the OS 116 to become consistent with a configuration of the firmware 112 relating to the integrated storage control feature 108 (for legacy support using the chipset storage control feature driver 124). For example, both the firmware 112 and the OS 116 can have configuration settings indicating that the integrated storage control feature 108 (or equivalently, the integrated storage control feature driver 122) has been disabled. In this manner, a fault such as a BSOD can be avoided.

In other examples, instead of issuing a warning to the user to confirm the disabling of the integrated storage control feature 108 and to prompt the performance of a restart, the utility program 130 can instead automatically take a remediation action (e.g., by restarting the computer system 100) in response to detecting that the integrated storage control feature 108 has been disabled.

Figure 3:
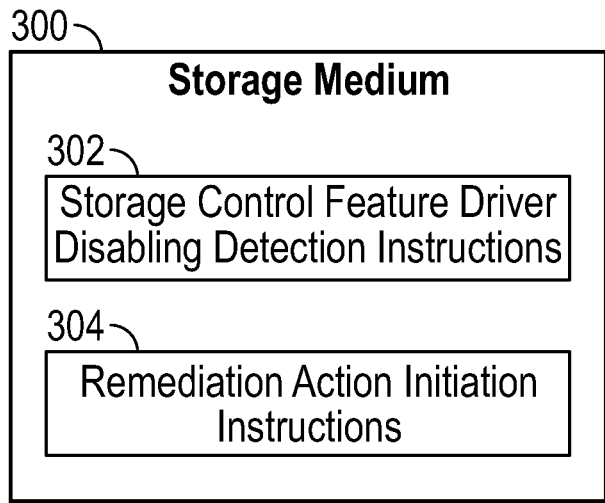
FIG. 3 is a block diagram of a storage medium storing machine-readable instructions according to some examples.

FIG. 3 is a block diagram of a non-transitory machine-readable or computer-readable storage medium 300 storing machine-readable instructions that upon execution cause a system (e.g., the computer system 100 of FIG. 1) to perform various actions.

The machine-readable instructions include storage control feature driver disabling detection instructions 302 to detect disabling of a driver of an integrated storage control feature (e.g., 108 in FIG. 1) included in a main processor (e.g., 102) of the system.

The machine-readable instructions include remediation action initiation instructions 304 to, in response to detecting the disabling of the driver of the integrated storage control feature included in the main processor, initiate a remediation action to prevent a fault in the system.

In some examples, the disabling of the driver of the storage control feature included in the main processor is performed based on a setting of boot code (e.g., 110 in FIG. 1) in the system.

In some examples, the detecting of the disabling of the driver of the storage control feature included in the main processor is based on a user modification of the setting of the boot code to disable the driver of the storage control feature included in the main processor.

Figure 4:
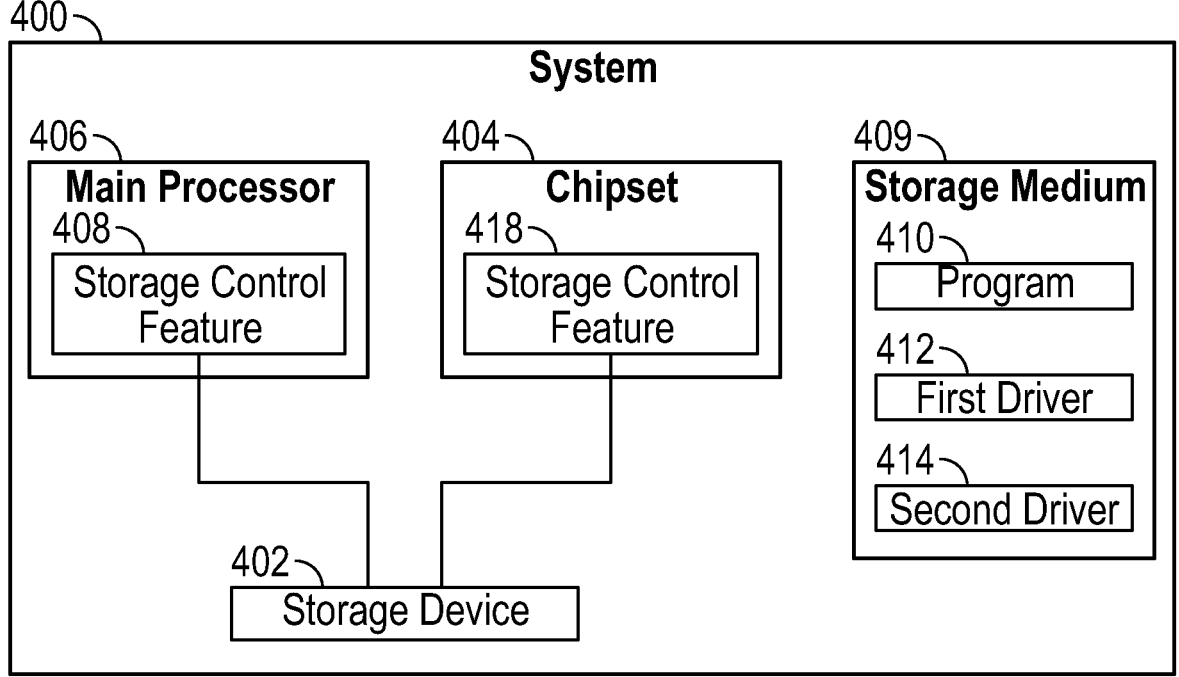
FIG. 4 is a block diagram of a system according to some examples.

FIG. 4 is a block diagram of a system 400 that includes a storage device 402, a chipset 404, and a main processor 406 including a storage control feature 408 to manage access of the storage device 402.

The system 400 includes a storage medium 409 storing a program 410 executable on the main processor 406 to perform various tasks. The tasks performed by the program 410 include a first driver disabling detection task to detect disabling of a first driver 412 of the storage control feature 408 included in the main processor 406.

The tasks performed by the program 410 include a remediation action initiation task to, in response to detecting the disabling of the first driver of the storage control feature 408 included in the main processor 406, initiate a remediation action to prevent a fault in the system 400.

After the remediation action, a second driver 414 is executable on the main processor 406 to manage access of the storage device 402 using a storage control feature 418 of the chipset 404.

FIG. 5 is a flow diagram of a process 500 according to some examples. The process 500 includes receiving (at 502) a user modification of a setting that disables a storage control feature included in the main processor, the storage control feature to manage access of the storage device.

The process 500 includes detecting (at 504), by a utility program executed in the system, the disabling of the storage control feature included in the main processor.

The process 500 includes initiating (at 506), by the utility program, a remediation action to prevent a fault caused by the disabling of the storage control feature included in the main processor.

After the remediation action, the process 500 includes activating (at 508) a storage control feature in a chipset of the system to manage access of the storage device.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:

detect, by a utility program, disabling of a driver of a storage control feature included in a main processor of the system, the storage control feature to manage access of a storage device, wherein the driver of the storage control feature included in the main processor is disabled based on a setting of boot code in the system, wherein the utility program is executed in an operating system (OS) environment of the system; and in response to detecting the disabling of the driver of the storage control feature included in the main processor, initiate a remediation action to prevent a fault in the system.

2. The non-transitory machine-readable storage medium of claim 1, wherein the setting of the boot code defaults to indicate enabling of the driver of the storage control feature included in the main processor.

3. The non-transitory machine-readable storage medium of claim 2, wherein the detecting of the disabling of the driver of the storage control feature included in the main processor is based on a user modification of the setting of the boot code to disable the driver of the storage control feature included in the main processor.

4. The non-transitory machine-readable storage medium of claim 3, wherein the user modification of the setting of the boot code to disable the driver of the storage control feature included in the main processor is performed using a setup menu of the boot code presented during a boot process of the system.

5. The non-transitory machine-readable storage medium of claim 1, wherein the initiating of the remediation action is to cause a reboot of the system after the disabling of the driver of the storage control feature included in the main processor.

6. The non-transitory machine-readable storage medium of claim 5, wherein after the reboot the system is to use a storage control feature in a device separate from the main processor to manage access of the storage device.

7. The non-transitory machine-readable storage medium of claim 1, wherein the initiating of the remediation action is to cause a configuration of firmware in the system relating to the storage control feature included in the main processor to become consistent with a configuration of an operating system (OS) relating to the storage control feature included in the main processor.

8. The non-transitory machine-readable storage medium of claim 1, wherein the storage control feature is to manage access of a storage device that is a Non-Volatile Memory Express (NVME) storage device.

9. The non-transitory machine-readable storage medium of claim 1, wherein a memory of the system stores a flag having a state that is indicative of whether the driver of the storage control feature is enabled, and wherein the utility program detects the disabling of the driver of the storage control feature by checking the state of the flag.

10. The non-transitory machine-readable storage medium of claim 1, wherein the remediation action includes a warning, generated by the utility program executing in the OS environment, for display before the disabling of the driver causes the fault in the system.

11. A system comprising:

a storage device;

a chipset;

a storage medium storing a utility program;

a main processor including a storage control feature to manage access of the storage device, the main processor to:

execute the utility program in an operating system (OS) environment of the system;

detect, via the utility program executing in the OS environment, disabling of a first driver of the storage control feature included in the main processor, wherein the first driver of the storage control feature included in the main processor is disabled based on a setting of boot code in the system; and in response to detecting the disabling of the first driver of the storage control feature included in the main processor, initiate a remediation action to prevent a fault in the system that would be caused due to the disabling of the first driver, wherein after the remediation action, a second driver is executable on the main processor to manage access of the storage device using a storage control feature of the chipset.

12. The system of claim 11, wherein the storage medium further stores the boot code executable on the main processor to:

present, during a boot process performed by the boot code, the setting indicating that the first driver is enabled, wherein the detecting of the disabling of the first driver of the storage control feature included in the main processor is responsive to a user modification of the setting to disable the first driver.

13. The system of claim 11, wherein the main processor is to:

automatically initiate the remediation action in response to detecting that the storage control feature has been disabled.

14. A method performed in a system comprising a main processor, comprising:

receiving a user modification of a setting that disables a storage control feature included in the main processor, the storage control feature to manage access of a storage device, wherein the setting is boot code in the system;

detecting, by a utility program, the disabling of the storage control feature included in the main processor, wherein a driver of the storage control feature included in the main processor is disabled based on a setting of the boot code in the system, wherein the utility program is executed in an operating system (OS) environment of the system and is invoked after the OS environment is launched;

initiating, by the utility program, a remediation action to prevent a fault caused by the disabling of the storage control feature included in the main processor; and after the remediation action, activating a storage control feature in a chipset of the system to manage access of the storage device.

15. The method of claim 14, wherein the remediation action comprises a reboot of the system that causes a configuration of firmware in the system relating to the storage control feature to be consistent with a configuration of an operating system (OS) in the system.

16. The method of claim 14, wherein detecting, by the utility program, the disabling of the storage control feature includes the utility program monitoring a state of a flag that indicates whether the driver of the storage control feature is enabled.

17. The method of claim 14, wherein the remediation action includes presenting, by the utility program executing in the OS environment, a warning that a stop error associated with disabling the driver may occur in the future.

\* \* \* \* \*